United States Patent
Kobayashi et al.

(10) Patent No.: US 11,734,928 B2
(45) Date of Patent: Aug. 22, 2023

(54) VEHICLE CONTROLS AND CABIN INTERIOR DEVICES AUGMENTED REALITY USAGE GUIDE

(71) Applicant: HONDA MOTOR CO., LTD., Tokyo (JP)

(72) Inventors: Masahide Kobayashi; Daisuke Yamaoka, Tokyo (JP); Yoshiaki Nedachi, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/512,187

(22) Filed: Oct. 27, 2021

(65) Prior Publication Data
US 2022/0129676 A1 Apr. 28, 2022

(30) Foreign Application Priority Data
Oct. 28, 2020 (JP) ................................. 2020-180576

(51) Int. Cl.
*G06V 20/20* (2022.01)
*G06V 20/59* (2022.01)
*G06F 3/14* (2006.01)

(52) U.S. Cl.
CPC .............. *G06V 20/20* (2022.01); *G06F 3/14* (2013.01); *G06V 20/59* (2022.01)

(58) Field of Classification Search
None
See application file for complete search history.

(56) References Cited

U.S. PATENT DOCUMENTS

2012/0065814 A1* 3/2012 Seok ................... G06F 3/04886
382/104
2013/0335407 A1* 12/2013 Reitan ..................... G09G 5/377
345/419

(Continued)

FOREIGN PATENT DOCUMENTS

DE 10 2016 123 360 A1 6/2017
DE 10 2016 123 630 A1 6/2017

(Continued)

OTHER PUBLICATIONS

Office Action dated Jul. 12, 2022 issued over the corresponding Japanese Patent Application No. 2020-180576 with the English translation thereof.

(Continued)

*Primary Examiner* — Edward Martello
(74) *Attorney, Agent, or Firm* — Carrier, Shende & Associates P.C.; Joseph P. Carrier; Fulchand P. Shende

(57) ABSTRACT

Provided is an information providing method in which a terminal apparatus including an imaging unit and a display unit displays, on the display unit, an image of a vehicle interior captured by the imaging unit. A plurality of devices are installed in the vehicle interior and classified into a plurality of types. The information providing method includes an image acquisition step of acquiring the image of the vehicle interior captured by the imaging unit, and a display step of displaying the image on the display unit, and in a case where at least one of the plurality of devices is included in the image, displaying a graphic corresponding to the device in a superimposed manner on the device and also displaying information indicating a type to which the device belongs.

18 Claims, 9 Drawing Sheets

(56) References Cited

U.S. PATENT DOCUMENTS

| | | | |
|---|---|---|---|
| 2015/0274016 A1 | 10/2015 | Kinoshita et al. | |
| 2017/0166056 A1* | 6/2017 | Buttolo | B60K 37/06 |
| 2018/0061153 A1 | 3/2018 | Ho et al. | |
| 2020/0234610 A1* | 7/2020 | Kleiner | G06T 17/00 |
| 2020/0370886 A1* | 11/2020 | Chen | G01S 17/88 |
| 2021/0224976 A1 | 7/2021 | Yonezawa et al. | |

FOREIGN PATENT DOCUMENTS

| | | |
|---|---|---|
| JP | 2015-193280 A | 11/2015 |
| JP | 2018-036811 A | 3/2018 |
| WO | 2019/235245 A1 | 12/2019 |

OTHER PUBLICATIONS

Extended European search report dated Feb. 28, 2022 issued over the corresponding EP Patent Application No. 21204745.0.

\* cited by examiner

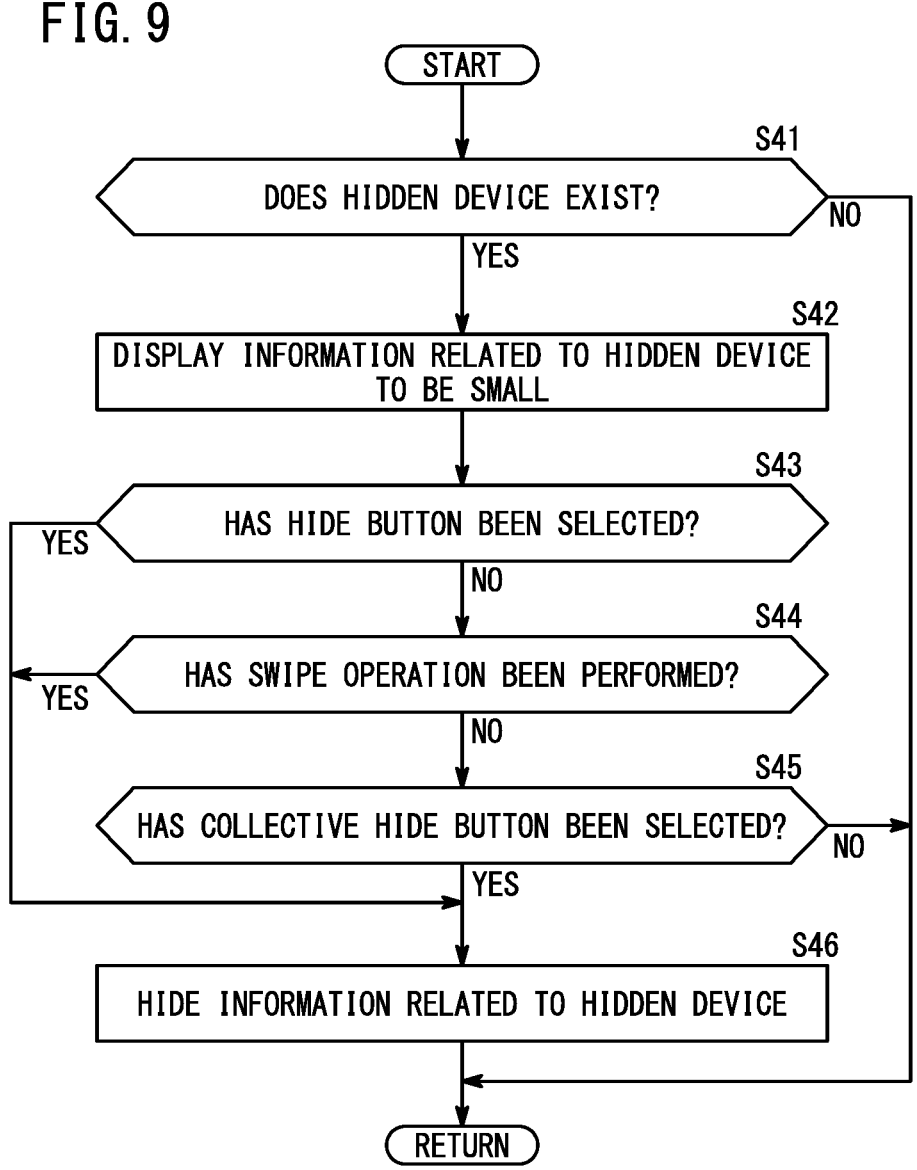

VEHICLE CONTROLS AND CABIN INTERIOR DEVICES AUGMENTED REALITY USAGE GUIDE

CROSS-REFERENCE TO RELATED APPLICATION

This application is based upon and claims the benefit of priority from Japanese Patent Application No. 2020-180576 filed on Oct. 28, 2020, the contents of which are incorporated herein by reference.

BACKGROUND OF THE INVENTION

Field of the Invention

The present invention relates to an information providing method, a non-transitory computer-readable storage medium storing a program, and an information providing apparatus.

Description of the Related Art

JP 2018-036811 A discloses a vehicle information providing system for providing vehicle information. In JP 2018-036811 A, a photograph of an inquiry target spot of a device or equipment of the vehicle is taken by a portable terminal, and the taken photograph is transmitted from the portable terminal to a processing server. The processing server includes a recognition server and a FAQ database. The recognition server recognizes an inquiry target spot indicated by the photograph transmitted from the portable terminal. The FAQ database includes a plurality of pieces of explanation information for explaining devices and equipment. The processing server selects, from the FAQ database, explanation information corresponding to the inquiry target spot recognized by the recognition server and transmits the explanation information. The explanation information transmitted from the processing server is displayed on a display device provided in the vehicle.

SUMMARY OF THE INVENTION

However, JP 2018-036811 A merely discloses displaying explanation information corresponding to an inquiry target spot indicated by a photograph on a display device. That is, the information providing system disclosed in JP 2018-036811 A cannot always satisfactorily provide information related to devices in the vehicle.

An object of the present invention is to solve the above-described problem.

According to an aspect of the present invention, provided is an information providing method in which a terminal apparatus including an imaging unit and a display unit displays, on the display unit, an image of a vehicle interior captured by the imaging unit, wherein a plurality of devices are installed in the vehicle interior, the plurality of devices being classified into a plurality of types, the information providing method comprising: an image acquisition step of acquiring the image of the vehicle interior captured by the imaging unit; and a display step of displaying the image on the display unit, and in a case where at least one of the plurality of devices is included in the image, displaying a graphic corresponding to the device in a superimposed manner on the device and also displaying information indicating a type to which the device belongs.

According to another aspect of the present invention, provided is a non-transitory computer-readable storage medium storing a program for causing a computer to execute the information providing method as described above.

According to still another aspect of the present invention, provided is an information providing apparatus including an imaging unit and a display unit, the information providing apparatus displaying, on the display unit, an image of a vehicle interior captured by the imaging unit, wherein a plurality of devices are installed in the vehicle interior, the plurality of devices being classified into a plurality of types, and the information providing apparatus comprises: an image acquisition unit configured to acquire the image of the vehicle interior captured by the imaging unit; and a display control unit configured to display the image on the display unit, and in a case where at least one of the plurality of devices is included in the image, display a graphic corresponding to the device in a superimposed manner on the device and also display information indicating a type to which the device belongs.

According to the present invention, it is possible to provide an information providing method, a non-transitory computer-readable storage medium storing a program, and an information providing apparatus, which are capable of more satisfactorily providing information related to devices in the vehicle interior.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 9 is a flowchart illustrating an example of an information providing method according to the embodiment.

DESCRIPTION OF THE PREFERRED EMBODIMENTS

Embodiment

Figure 1:
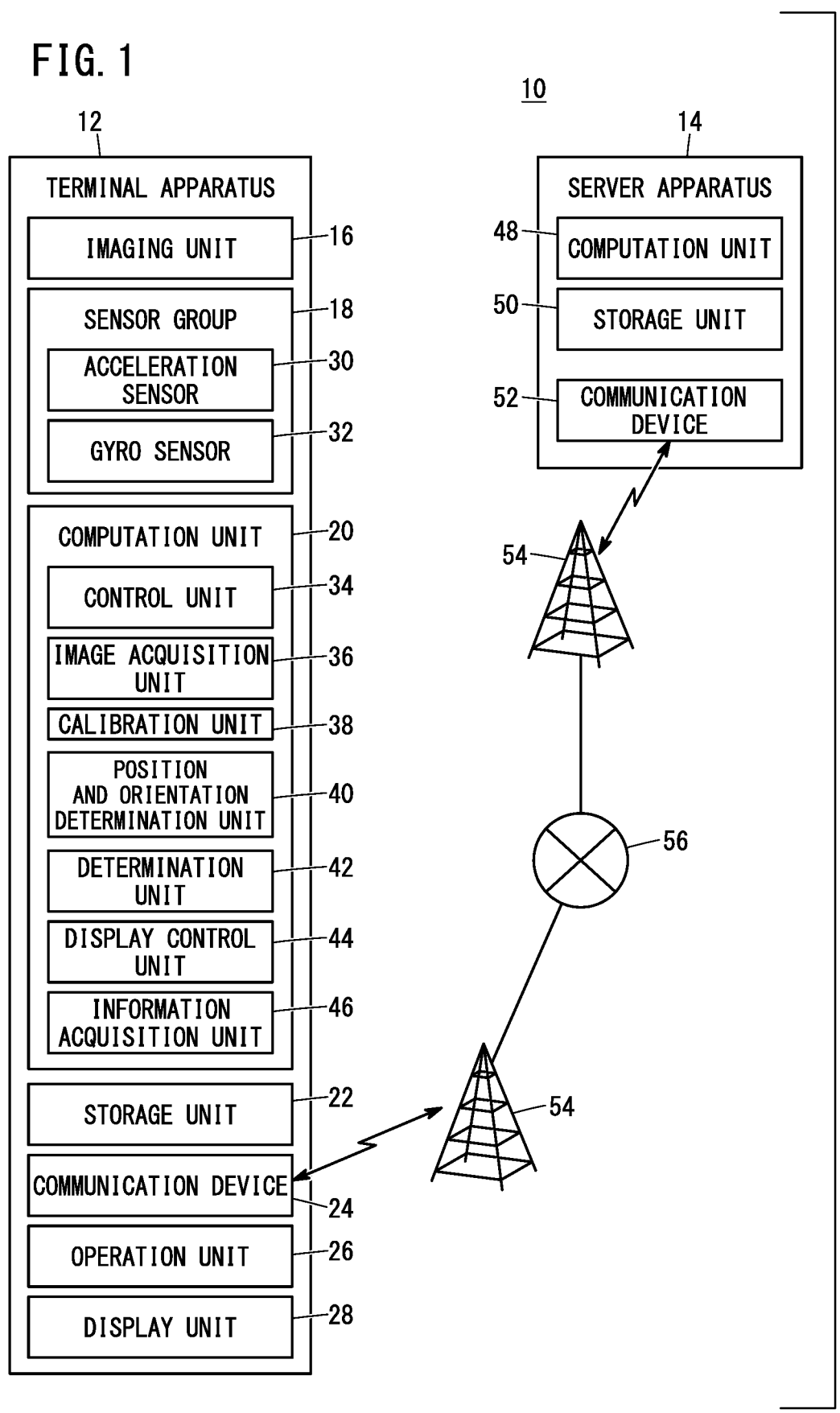
FIG. 1 is a block diagram showing an information providing system according to an embodiment.

An information providing method, a non-transitory computer-readable storage medium storing a program, and an information providing apparatus according to an embodiment will be described with reference to FIGS. 1 to 9. FIG. 1 is a block diagram showing an information providing system according to the present embodiment.

An information providing system 10 according to the present embodiment can be formed of a terminal apparatus (user terminal, portable terminal, information providing apparatus) 12, and a server apparatus (server) 14, but is not limited thereto.

The terminal apparatus 12 includes an imaging unit 16, a sensor group 18, a computation unit 20, a storage unit 22, a communication device 24, an operation unit 26, and a display unit 28. The terminal apparatus 12 may include components other than these components, but the description thereof is omitted here. The server apparatus 14 includes a computation unit 48, a storage unit 50, and a communication device 52. The server apparatus 14 may include components other than these components, but the description thereof is omitted here.

In the terminal apparatus 12, an application program for causing a computer to execute the information providing method according to the present embodiment is installed in advance. The application program can be started based on an operation by a user, for example.

The imaging unit 16, that is, a camera can be provided at least on the rear surface side of the terminal apparatus 12. An image acquired using the imaging unit 16 can be displayed on a display screen 28A (see FIG. 2) of the display unit 28 provided on the front side (front surface side) of the terminal apparatus 12.

The sensor group 18 may include, for example, an acceleration sensor 30 and a gyro sensor 32. The acceleration sensor 30 can simultaneously measure acceleration in three directions, for example. The gyro sensor 32, that is, the angular velocity sensor can simultaneously measure angular velocities in three directions, for example. The three dimensional behavior of the terminal apparatus 12 can be grasped based on information acquired by the acceleration sensor 30 and the gyro sensor 32.

The computation unit 20 can be formed of, for example, a central processing unit (CPU), an application specific integrated circuit (ASIC), or the like, but the present invention is not limited thereto. The computation unit 20 includes a control unit 34, an image acquisition unit 36, a calibration unit 38, a position and orientation determination unit 40, a determination unit 42, a display control unit 44, and an information acquisition unit 46. The control unit 34, the image acquisition unit 36, the calibration unit 38, the position and orientation determination unit 40, the determination unit 42, the display control unit 44, and the information acquisition unit 46 can be realized by the computation unit 20 executing programs stored in the storage unit 22.

The storage unit 22 includes a volatile memory (not shown) and a nonvolatile memory (not shown). Examples of the volatile memory include a RAM, for example. Examples of the nonvolatile memory include a ROM and a flash memory, for example. Programs, tables, maps, etc. can be stored in the non-volatile memory, for example.

The communication device (communication unit) 24 includes, for example, a communication module (not shown) compatible with a mobile phone network. The communication device 24 can perform communication via a telephone network. The communication device 24 can communicate with the communication device 52 provided in the server apparatus 14, via a relay station 54 and a network 56.

The operation unit 26 can be used when a user operates the terminal apparatus 12. The display unit 28 includes a display element (not shown). As the display element, for example, a liquid crystal display element, an organic electroluminescence display element, or the like can be used. A touch panel (not shown) provided with such a display element can form the operation unit 26 and the display unit 28.

The control unit 34 controls the entire terminal apparatus 12.

The image acquisition unit 36 can acquire an image of a vehicle interior captured by the imaging unit 16.

The calibration unit 38 can perform calibration processing. Calibration can be performed prior to initiating the provision of information to the user. Such calibration can be performed by, for example, capturing an image of a home button (not shown) provided in a vehicle interior 100 (see FIG. 2) using the imaging unit 16 of the terminal apparatus 12, in a state where the application program according to the present embodiment is started. More specifically, the user causes the imaging unit 16 of the terminal apparatus 12 to face the home button so that the home button is displayed in a predetermined size at the center of the display screen 28A of the display unit 28. The calibration unit 38 can determine the position and the orientation of the terminal apparatus 12 based on the image including the home button and signals supplied from the sensor group 18. When it is determined that the position and orientation of the terminal apparatus 12 are within a predetermined range, the calibration unit 38 determines that the calibration is successful and completes the calibration. When the calibration is completed, the display control unit 44 displays information indicating that the calibration is completed, on the display screen 28A of the display unit 28. As the information indicating that the calibration is completed, for example, a check mark (not shown) or the like can be used.

The position and orientation determination unit 40 can determine the position and orientation of the terminal apparatus 12. The position and orientation determination unit 40 stores information related to the position and orientation of the terminal apparatus 12 in the storage unit 22. That is, the position and orientation determination unit 40 stores position and orientation information in the storage unit 22. The position and orientation determination unit 40 updates the position and orientation information as needed based on the image acquired by the image acquisition unit 36 and the signals supplied from the sensor group 18, with reference to the position and orientation information obtained during calibration.

Figure 2:
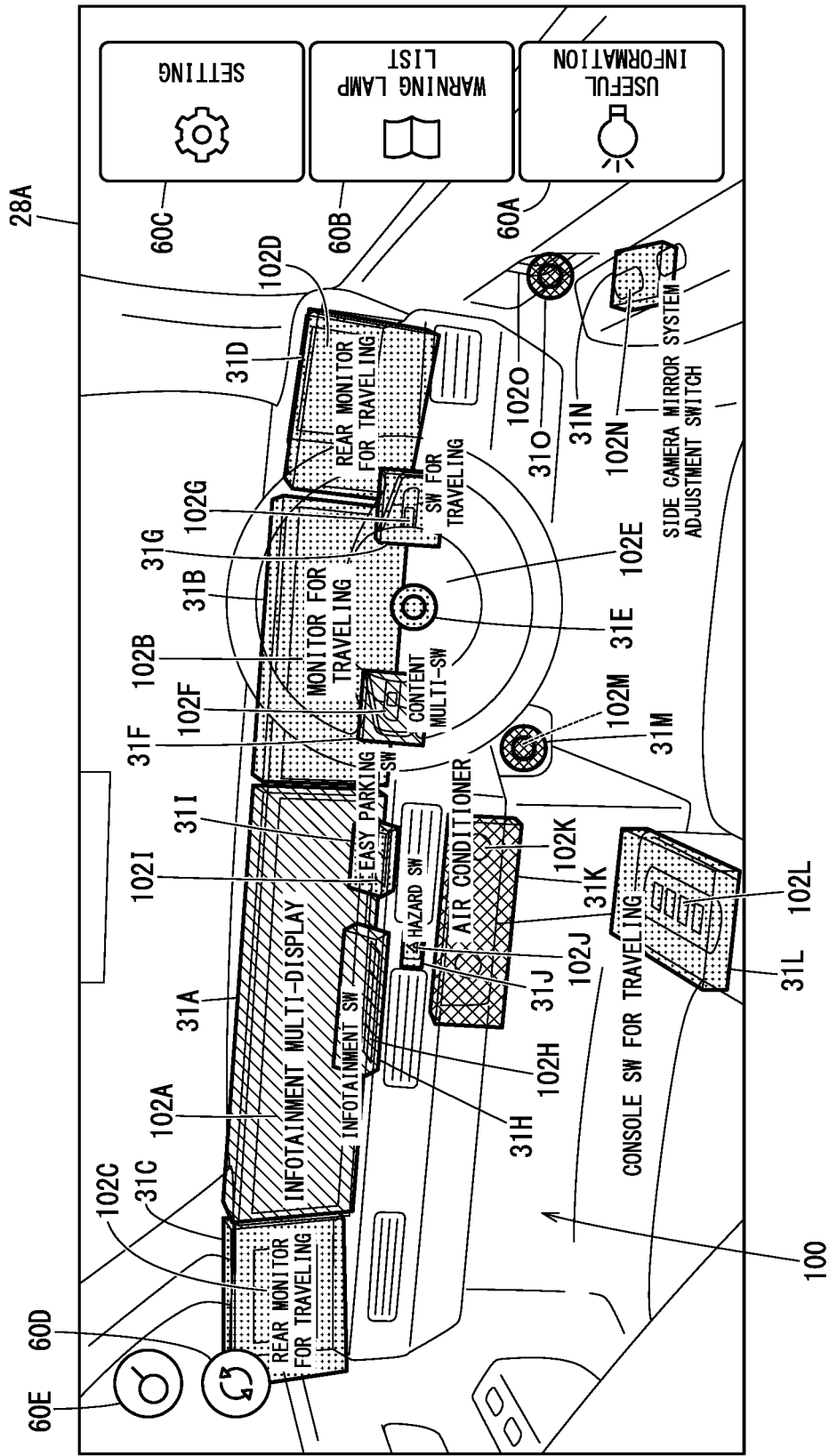
FIG. 2 is a diagram showing an example of an image displayed on a display screen of a display unit.

FIG. 2 is a diagram showing an example of an image displayed on the display screen of the display unit. FIG. 2 shows an example of an image displayed when the compartment interior of the vehicle, that is, the vehicle interior (vehicle compartment interior) 100 is photographed. As shown in FIG. 2, an image of the vehicle interior 100 can be displayed on the display screen 28A of the display unit 28. A plurality of operation buttons 60A to 60C can be displayed on a part of the display screen 28A. The operation button 60A is, for example, a useful information button. The operation button 60B is, for example, a warning lamp list button. The operation button 60C is, for example, a setting button. The operation buttons 60A to 60C are not limited thereto. The operation button 60A, that is, the useful information button is a button for transitioning to a screen on which information expected to be useful to the user is displayed. The operation button 60B, that is, the warning lamp list button is a button for transitioning to a screen on which a list of warning lamps is displayed. The operation button 60C, that is, the setting button is a button for transitioning to a screen for performing various settings related to the application program. The display screen 28A can further display a recalibration button 60D, a voice search button 60E, and the like, but the present invention is not limited thereto. The recalibration button 60D is a button for instructing execution of recalibration. The voice search button 60E is a button for instructing execution of voice search.

As shown in FIG. 2, a plurality of devices 102A to 102O are installed in the vehicle interior 100. Reference numeral 102 is used to describe the devices in general, and reference numerals 102A to 102O are used to describe individual devices. The device 102A is, for example, an infotainment multi-display device. The device 102B is, for example, a monitor for traveling. The devices 102C and 102D are, for example, rear monitors for traveling. The device 102E is, for example, a steering wheel. The device 102F is, for example, a content multi-switch. The device 102G is, for example, a switch for traveling. The device 102H is, for example, an infotainment switch. The device 102I is, for example, an easy parking switch. The device 102J is, for example, a hazard switch. The device 102K is, for example, an air conditioner, that is, an air conditioning device. The device 102L is, for example, a console switch for traveling. The device 102M is, for example, an ETC in-vehicle device. The device 102N is, for example, a side camera mirror system adjustment switch. The device 102O is, for example, a door knob.

As shown in FIG. 2, in the present embodiment, graphics 31A to 31O corresponding to the devices 102A to 102O are displayed in a superimposed manner on the devices 102A to 102O, and information indicating the types to which the devices 102A to 102O belong is also displayed. That is, in the present embodiment, augmented reality (AR) display can be performed. Note that reference numeral 31 is used to describe the graphics in general, and reference numerals 31A to 31O are used to describe individual graphics.

The determination unit 42 determines whether or not at least one of the plurality of devices 102 installed in the vehicle interior 100 is included in the image acquired by the image acquisition unit 36. More specifically, the determination unit 42 determines whether or not the device 102 that is the target of the augmented reality display is included in the image. This determination can be performed based on the position and orientation information obtained by the position and orientation determination unit 40, and the image acquired by the image acquisition unit 36. The reason why it is determined whether or not the device 102 as the target of the augmented reality display is included in the image based on not only the image acquired by the image acquisition unit 36 but also the position and orientation information is to perform more accurate determination. Information indicating the device 102 installed in the vehicle interior 100 is stored in advance in the storage unit 22. More specifically, position information of each of the plurality of devices 102 installed in the vehicle interior 100, image information of each of the devices 102, and the like are stored in advance in the storage unit 22. The determination unit 42 compares the information stored in the storage unit 22 with information obtained from the image acquired by the image acquisition unit 36. As a result, the determination unit 42 can determine whether or not at least one of the plurality of devices 102 installed in the vehicle interior 100 is included in the image. The determination unit 42 can also determine which device 102 among the plurality of devices 102 installed in the vehicle interior 100 is the device 102 included in the image.

The plurality of devices 102 installed in the vehicle interior 100 are classified into a plurality of types in advance. For example, the classification may be performed by a function of the device 102, but the present invention is not limited thereto. Examples of such types include, but are not limited to, a travel group, an entertainment group, and a comfort group. The device 102 classified into the travel group is a device related to traveling of the vehicle, and may be, for example, a speedometer or the like. The device 102 classified into the entertainment group is a device related to entertainment, and may be, for example, an audio device. The device 102 classified into the comfort group is a device for ensuring comfort in the vehicle interior 100, and may be, for example, an air conditioner.

The display control unit 44 displays the image acquired by the image acquisition unit 36 on the display screen 28A of the display unit 28, and performs the following processing when at least one of the plurality of devices 102 installed in the vehicle interior 100 is included in the image. That is, in such a case, the display control unit 44 displays the graphic 31 corresponding to the device 102 in a superimposed manner on the device 102, and also displays information indicating the type to which the device 102 belongs.

The graphic 31 corresponding to the device 102 is, for example, a translucent graphic, but is not limited thereto. For example, only the outline of the graphic 31 may be displayed.

The information indicating the type to which the device 102 belongs is, for example, a color corresponding to the type. Since the graphic 31 in the color corresponding to the type is displayed in a superimposed manner on the device 102, the user can satisfactorily grasp the function or the like of the device 102 based on the color. For example, the graphic 31 in red can be used for the device 102 of the travel group. Further, for example, the graphic 31 in blue can be used for the device 102 of the entertainment group. Further, for example, the graphic 31 in yellow can be used for the device 102 of the comfort group. Note that the information indicating the type to which the device 102 belongs is not limited thereto.

The graphic 31 corresponding to the device 102 is preferably a three dimensional graphic. Displaying the three dimensional graphic 31 contributes to smooth recognition of the user.

The graphic 31 corresponding to the device 102 preferably has a size corresponding to the size of the device 102. Displaying the graphic 31 having a size corresponding to the size of the device 102 also contributes to smooth recognition of the user.

The graphic 31 corresponding to the device 102 preferably has a shape corresponding to the shape of the device 102. Displaying the graphic 31 having a shape corresponding to the shape of the device 102 also contributes to smooth recognition of the user.

As shown in FIG. 2, the name or the like of the device 102 may be displayed together with the graphic 31 corresponding to the device 102.

The device 102 installed in the vehicle interior 100 may include a plurality of constituent members (constituent elements) such as 104FA, 104FB, and 104FC (see FIG. 4) constituting a part of the device 102. Note that reference numeral 104 is used to describe the constituent members in general, and reference numerals 104FA, 104FB, and 104FC are used to describe the individual constituent members included in the device 102F. Examples of the constituent member 104 include operation members such as an operation switch, an operation button, and an operation lever. The constituent member 104FA is a selector wheel. The constituent member 104FB is a home switch. The constituent member 104FC is a speech switch. Further, examples of the constituent member 104 may also include an indicator such as a tachometer. Note that the constituent member 104 is not limited thereto.

In a case where the distance between the terminal apparatus 12 and the device 102 is relatively large although the plurality of constituent members 104 constituting the device 102 are provided in the device 102, the plurality of constituent members 104 appear in an image in a state of being close to each other. In such a case, when information 64FA to 64FC (see FIG. 4) related to each of the plurality of constituent members 104 is simply displayed for each of the plurality of constituent members 104, it is difficult to grasp which constituent member 104 the information is related to. Reference numeral 64 is used to describe information in general, and reference numerals 64FA to 64FC are used to describe individual information. On the other hand, when the distance between the terminal apparatus 12 and the device 102 is relatively small, the constituent members 104 adjacent to each other appear in an image in a sufficiently separated state. In such a case, even if the information 64 related to each of the plurality of constituent members 104 is displayed for each of the plurality of constituent members 104, the user can satisfactorily grasp which constituent member 104 the information 64 is related to. Therefore, in the present embodiment, when the distance between the device 102 and the terminal apparatus 12 is equal to or greater than a first distance threshold DTH1, the graphic 31 corresponding to the device 102 is displayed in a superimposed manner on the device 102 without displaying, for the constituent member 104, the information 64 related to the constituent member 104. On the other hand, when the distance between the terminal apparatus 12 and the device 102 is less than the first distance threshold DTH1, the information 64 related to the constituent member 104 of the device 102 is displayed for the constituent member 104 without displaying the graphic 31 corresponding to the device 102 in a superimposed manner on the device 102. Examples of the information 64 related to the constituent member 104 include, but are not limited to, the name of the constituent member 104. The distance between the terminal apparatus 12 and the device 102 can be measured using, for example, a distance measurement function of the imaging unit 16, but the present invention is not limited thereto.

Figure 3:
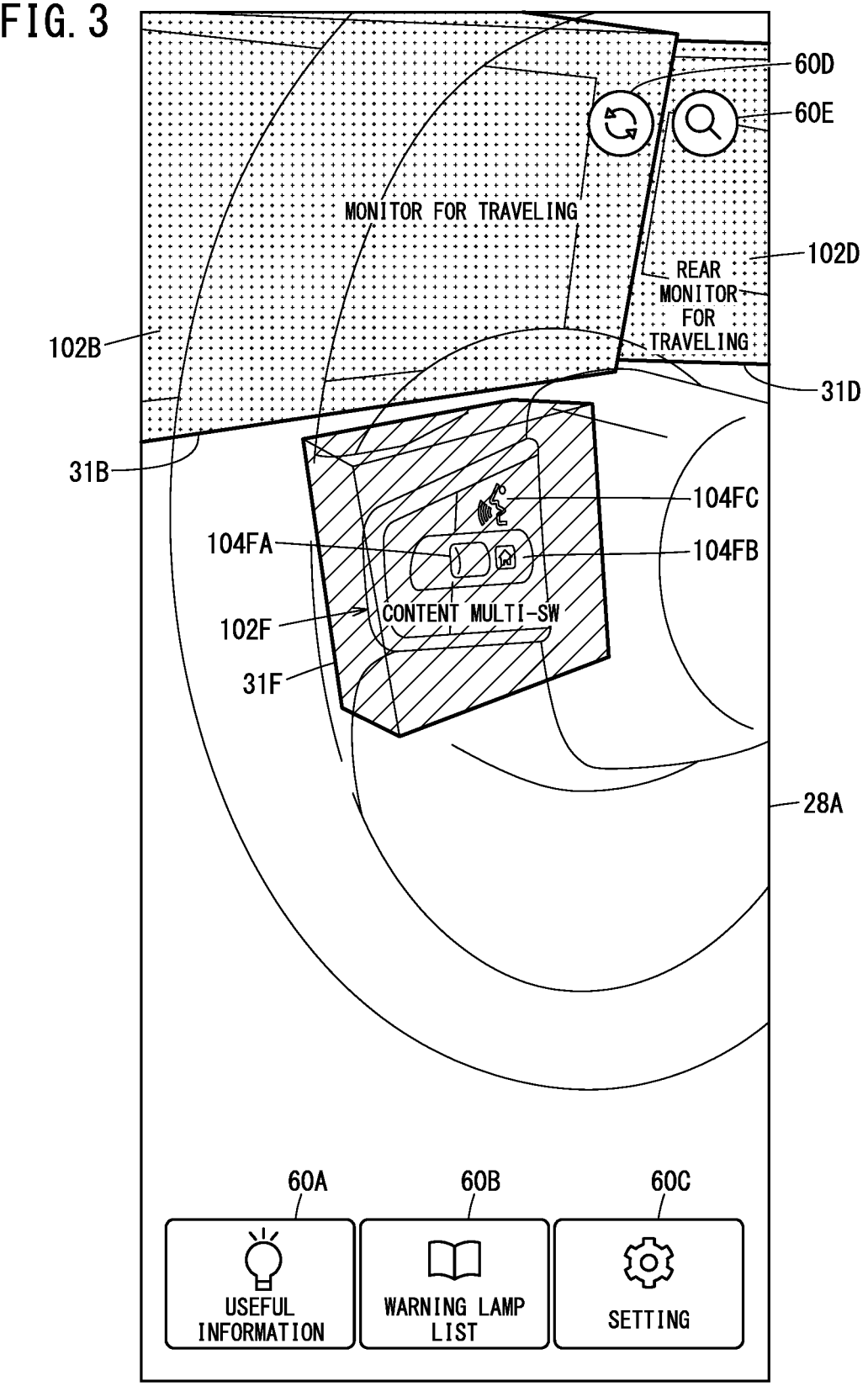
FIG. 3 is a diagram showing an example of an image displayed on the display screen of the display unit.

FIG. 3 is a diagram showing an example of an image displayed on the display screen of the display unit. An example of an image in a case where the distance between the device 102F and the terminal apparatus 12 is relatively large is shown in FIG. 3. As shown in FIG. 3, the display control unit 44 displays a graphic 31F corresponding to the device 102F in a superimposed manner on the device 102F without displaying the information 64FA to 64FC related to the constituent members 104FA to 104FC (see FIG. 4) constituting the device 102F. The device 102F can belong to the entertainment group, for example. Therefore, the graphic 31F can be displayed using, for example, blue.

Figure 4:
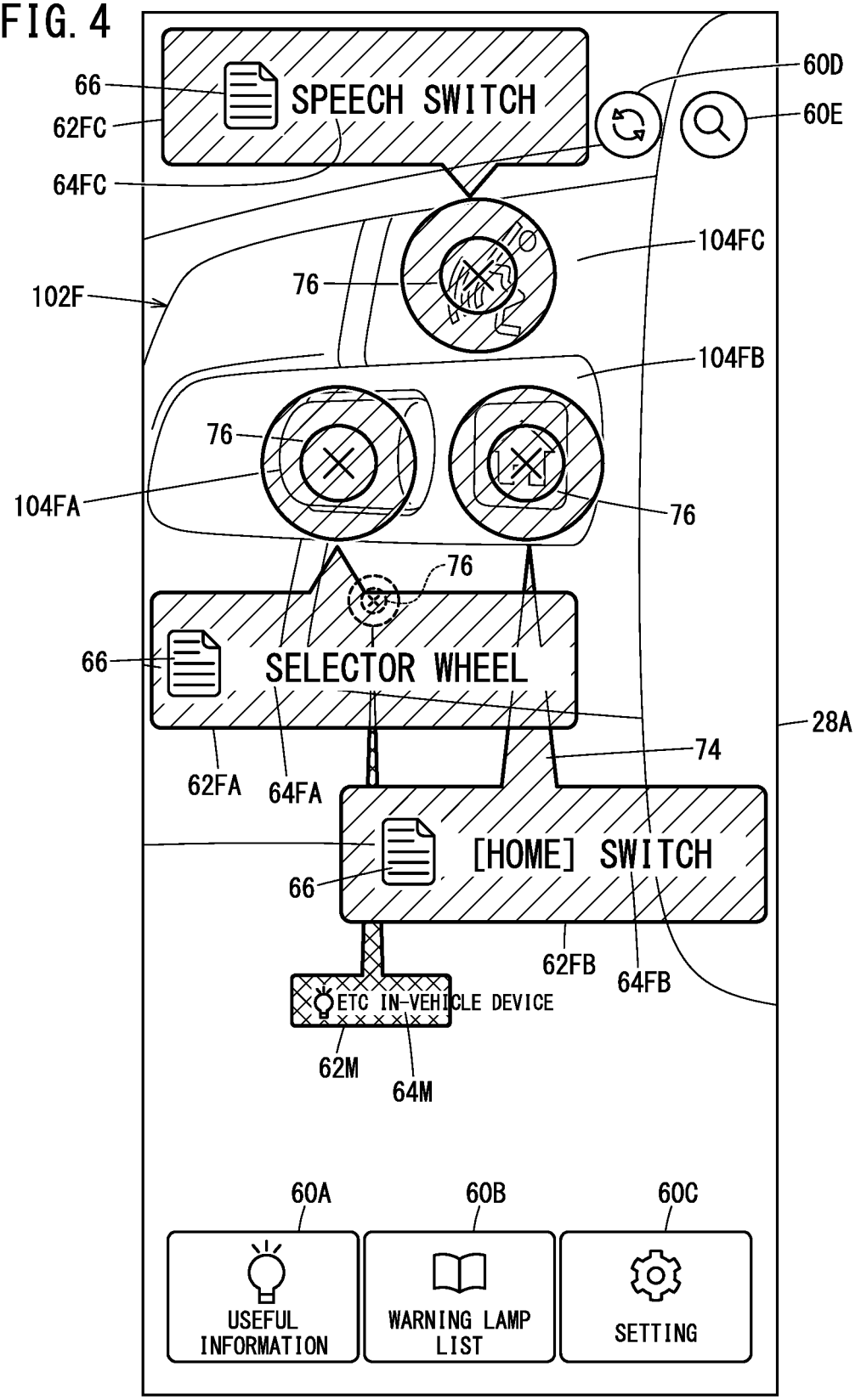
FIG. 4 is a diagram showing an example of an image displayed on the display screen of the display unit.

FIG. 4 is a diagram showing an example of an image displayed on the display screen of the display unit. An example of an image displayed in a case where the distance between the device 102F and the terminal apparatus 12 is relatively small is shown in FIG. 4. As shown in FIG. 4, the display control unit 44 displays the information 64FA to 64FC related to the constituent members 104FA to 104FC constituting the device 102F, without displaying the graphic 31F (see FIG. 3) corresponding to the device 102F (see FIG. 3) in a superimposed manner on the device 102F. As described above, the device 102F can belong to the entertainment group, for example. Therefore, the information 64FA to 64FC related to the constituent members 104FA to 104FC can be displayed using, for example, blue.

In a state where the graphic 31 corresponding to the device 102 is displayed in a superimposed manner on the device 102, when the distance between the device 102 and the terminal apparatus 12 becomes less than the first distance threshold DTH1, the display control unit 44 can perform the following control. That is, in a state where the display as shown in FIG. 3 is performed, when the distance between the device 102 and the terminal apparatus 12 becomes less than the first distance threshold DTH1, the display control unit 44 can perform the following control. In such a case, as shown in FIG. 4, the display control unit 44 can hide the graphic 31 corresponding to the device 102 and display, for the constituent member 104, the information 64 related to the constituent member 104 constituting the device 102.

In a state where the information 64 related to the constituent member 104 constituting the device 102 is displayed, when the distance between the device 102 and the terminal apparatus 12 becomes equal to or greater than a second distance threshold DTH2, which is greater than the first distance threshold DTH1, the display control unit 44 can perform the following control. That is, in a state where the display as shown in FIG. 4 is performed, when the distance between the device 102 and the terminal apparatus 12 becomes equal to or greater than the second distance threshold DTH2, which is greater than the first distance threshold DTH1, the display control unit 44 can perform the following control. In such a case, as shown in FIG. 3, the display control unit 44 can hide the information 64 related to the constituent member 104 constituting the device 102 and display the graphic 31 corresponding to the device 102 in a superimposed manner on the device 102.

In this manner, the distance threshold for transitioning to the state where the information 64 related to the constituent member 104 of the device 102 is displayed may be different from the distance threshold for transitioning to the state where the graphic 31 corresponding to the device 102 is displayed in a superimposed manner on the device 102. According to this configuration, even if the terminal apparatus 12 moves away from the device 102 to some extent, the information 64 related to the constituent member 104 constituting the device 102 continues to be displayed on the display screen 28A of the display unit 28, which contributes to improvement in convenience.

When the time during which the display unit 28 displaying the information 64 related to the constituent member 104 constituting the device 102 is continuously viewed by the user is equal to or longer than a time threshold TTH, the display control unit 44 can perform the following control. That is, in such a case, when the distance between the device 102 and the terminal apparatus 12 becomes equal to or greater than a third distance threshold DTH3, the display control unit 44 hides the information 64 related to the constituent member 104 and displays the graphic 31 corresponding to the device 102 in a superimposed manner on the device 102. On the other hand, when the time during which the display unit 28 displaying the information 64 related to the constituent member 104 is continuously viewed by the user is less than the time threshold TTH, the display control unit 44 can perform the following processing. That is, in such a case, when the distance between the device 102 and the terminal apparatus 12 becomes equal to or greater than a fourth distance threshold DTH4, the display control unit 44 hides the information 64 related to the constituent member 104, and displays the graphic 31 corresponding to the device 102 in a superimposed manner on the device 102. The fourth distance threshold DTH4 can be set to be smaller than the third distance threshold DTH3.

In this manner, the distance threshold for transitioning to the state where the information 64 related to the constituent member 104 is hidden may be changed based on the time during which the display unit 28 displaying the information 64 related to the constituent member 104 constituting the device 102 is continuously viewed by the user. In this way, in a case where the information 64 related to the constituent member 104 is viewed by the user for a relatively long time, even if the terminal apparatus 12 moves away from the device 102 to some extent, the information 64 related to the constituent member 104 continues to be displayed on the display screen 28A of the display unit 28. This contributes to improvement in convenience.

In a case where the graphic 31 corresponding to the device 102 has been selected by the user in a state where the graphic 31 is displayed in a superimposed manner on the device 102, the display control unit 44 can display, on the display screen 28A of the display unit 28, detailed information related to the device 102 on which the selected graphic 31 has been displayed in a superimposed manner. More specifically, the following processing can be performed. That is, in a case where the graphic 31 corresponding to the device 102 has been selected by the user in a state where the graphic 31 is displayed in a superimposed manner on the device 102, the information acquisition unit 46 performs the following processing. That is, in such a case, the information acquisition unit 46 transmits identification information indicating the device 102 on which the graphic 31 has been displayed in a superimposed manner, to the server apparatus 14 via the communication device 24. The server apparatus 14 reads information related to the device 102 from the storage unit 50 provided in the server apparatus 14, and transmits the information to the terminal apparatus 12 via the communication device 52 provided in the server apparatus 14. The information acquisition unit 46 receives detailed information related to the device 102 from the server apparatus 14. The display control unit 44 displays the detailed information related to the device 102 on the display screen 28A of the display unit 28. In a case where the detailed information related to the device 102 is already stored in the storage unit 22 provided in the terminal apparatus 12, it is not necessary to acquire the detailed information from the server apparatus 14. In such a case, the information acquisition unit 46 can acquire such detailed information from the storage unit 22 provided in the terminal apparatus 12.

As described above, the device 102 may include the plurality of constituent members 104 constituting the device 102. Information as to whether or not the device 102 includes the plurality of constituent members 104 is stored in advance in the storage unit 22. In a case where the graphic 31 corresponding to the device 102 including the plurality of constituent members 104 has been selected by the user in a state where the graphic 31 is displayed in a superimposed manner on the device 102, the display control unit 44 performs the following processing. That is, in such a case, the display control unit 44 can display, on the display screen 28A of the display unit 28, a list of pieces of detailed information related to the plurality of constituent members 104 constituting the device 102 on which the selected graphic 31 has been displayed in a superimposed manner. More specifically, the following processing can be performed. That is, in a case where the graphic 31 displayed in a superimposed manner on the device 102 including the plurality of constituent members 104 has been selected by the user, the information acquisition unit 46 transmits identification information indicating the device 102 on which the graphic 31 has been displayed in a superimposed manner, to the server apparatus 14 via the communication device 24. The server apparatus 14 reads a list of pieces of detailed information related to the plurality of constituent members 104 provided in the device 102, from the storage unit 50 provided in the server apparatus 14, and transmits the list to the terminal apparatus 12 via the communication device 52 provided in the server apparatus 14. The information acquisition unit 46 receives, from the server apparatus 14, the list of pieces of detailed information related to the plurality of constituent members 104 provided in the device 102. The display control unit 44 displays, on the display screen 28A of the display unit 28, the list of pieces of detailed information related to the plurality of constituent members 104 provided in the device 102. In a case where the list of pieces of detailed information related to the plurality of constituent members 104 provided in the device 102 is already stored in the storage unit 22 provided in the terminal apparatus 12, it is not necessary to acquire the list of pieces of detailed information from the server apparatus 14. In such a case, the information acquisition unit 46 can acquire the list of pieces of detailed information from the storage unit 22 provided in the terminal apparatus 12. Note that, when the list of pieces of detailed information is displayed on the display screen 28A of the display unit 28, the user views necessary detailed information among a plurality of pieces of detailed information included in the list of the detailed information by performing an appropriate scroll operation on the display screen 28A.

As shown in FIG. 4, the display control unit 44 can display an icon 66 for instructing display of the detailed information related to the constituent member 104 together with the information 64 related to the constituent member 104 constituting the device 102. The display control unit 44 can display the information 64 related to the constituent member 104 and the icon 66 within boxes 62FA to 62FC. Reference numeral 62 is used to describe the boxes in general, and reference numerals 62FA to 62FC are used to describe individual boxes. The display control unit 44 can display the box 62 with a balloon 74. The display control unit 44 can position the tip of the balloon 74 on the constituent member 104 corresponding to the box 62.

In a case where the icon 66 for instructing the display of the detailed information of the constituent member 104 has been selected by the user in a state where the information 64 related to the constituent member 104 provided in the device 102 is displayed, the display control unit 44 displays the detailed information related to the constituent member 104 on the display unit 28. More specifically, the following processing can be performed. That is, in such a case, the information acquisition unit 46 transmits identification information indicating the constituent member 104, to the server apparatus 14 via the communication device 24. The server apparatus 14 reads detailed information related to the constituent member 104 from the storage unit 50 provided in the server apparatus 14, and transmits the detailed information to the terminal apparatus 12 via the communication device 52 provided in the server apparatus 14. The information acquisition unit 46 receives the detailed information related to the constituent member 104 from the server apparatus 14. The display control unit 44 displays the detailed information related to the constituent member 104 on the display screen 28A of the display unit 28. In a case where the detailed information related to the constituent member 104 is already stored in the storage unit 22 provided in the terminal apparatus 12, it is not necessary to acquire the detailed information from the server apparatus 14. In such a case, the information acquisition unit 46 can acquire such detailed information from the storage unit 22 provided in the terminal apparatus 12.

The display control unit 44 can display the information 64 related to the device 102 that is hidden by the device 102 appearing in the image, on the display screen 28A of the display unit 28 to be smaller than the information 64 related to the device 102 appearing in the image. For example, in the example shown in FIG. 4, the device 102M is hidden by the device 102F appearing in the image. In such a case, the display control unit 44 displays information 64M related to the hidden device 102M on the display screen 28A of the display unit 28 to be smaller than the information 64FA to 64FC related to the device 102F appearing in the image. That is, the display control unit 44 displays the information 64M related to the hidden device 102M on the display screen 28A of the display unit 28 to be smaller than the information 64FA to 64FC related to the constituent members 104FA to 104FC constituting the device 102F appearing in the image. In this way, the user can satisfactorily recognize whether the information 64 is related to the device 102 appearing in the image or related to the hidden device 102.

In a case where an operation for hiding the information 64 related to the hidden device 102 has been performed by the user, the display control unit 44 can hide the information 64 related to the hidden device 102. Examples of the operation for hiding the information 64 related to the hidden device 102 may include, for example, selection of a hide button 76 for hiding the information 64 related to the hidden device 102. Further, examples of the operation for hiding the information 64 related to the hidden device 102 may include a swipe operation on the box 62 in which the information 64 related to the hidden device 102 is displayed. For example, in the example shown in FIG. 4, in a case where the hide button 76 has been selected by the user, the display control unit 44 hides the information 64M related to the hidden device 102M. Further, in the example shown in FIG. 4, in a case where the swipe operation has been performed on a box 62M, the display control unit 44 hides the information 64M related to the hidden device 102M.

In a case where an operation for hiding the information 64 related to the device 102 appearing in the image has been performed by the user, the display control unit 44 can hide the information 64 related to the device 102. Examples of the operation for hiding the information 64 related to the device 102 appearing in the image may include, for example, selection of the hide button 76 for hiding the information 64 related to the device 102. Further, examples of the operation for hiding the information 64 related to the device 102 may include a swipe operation on the box 62 in which the information 64 related to the device 102 is displayed. For example, in the example shown in FIG. 4, in a case where the hide buttons 76 displayed in a superimposed manner on the constituent members 104FA to 104FC have been selected by the user, the display control unit 44 hides the information 64FA to 64FC related to the device 102F. Further, in the example shown in FIG. 4, in a case where the swipe operation has been performed on the boxes 62FA to 62FC, the display control unit 44 hides the information 64FA to 64FC related to the device 102F.

The display control unit 44 can display, on the display screen 28A of the display unit 28, a collective hide button (not shown) for collectively hiding pieces of the information 64 respectively related to the plurality of devices 102 hidden by the device 102 appearing in the image. In a case where such a collective hide button has been selected by the user, the display control unit 44 can collectively hide the pieces of information 64 respectively related to the plurality of hidden devices 102.

Figure 5:
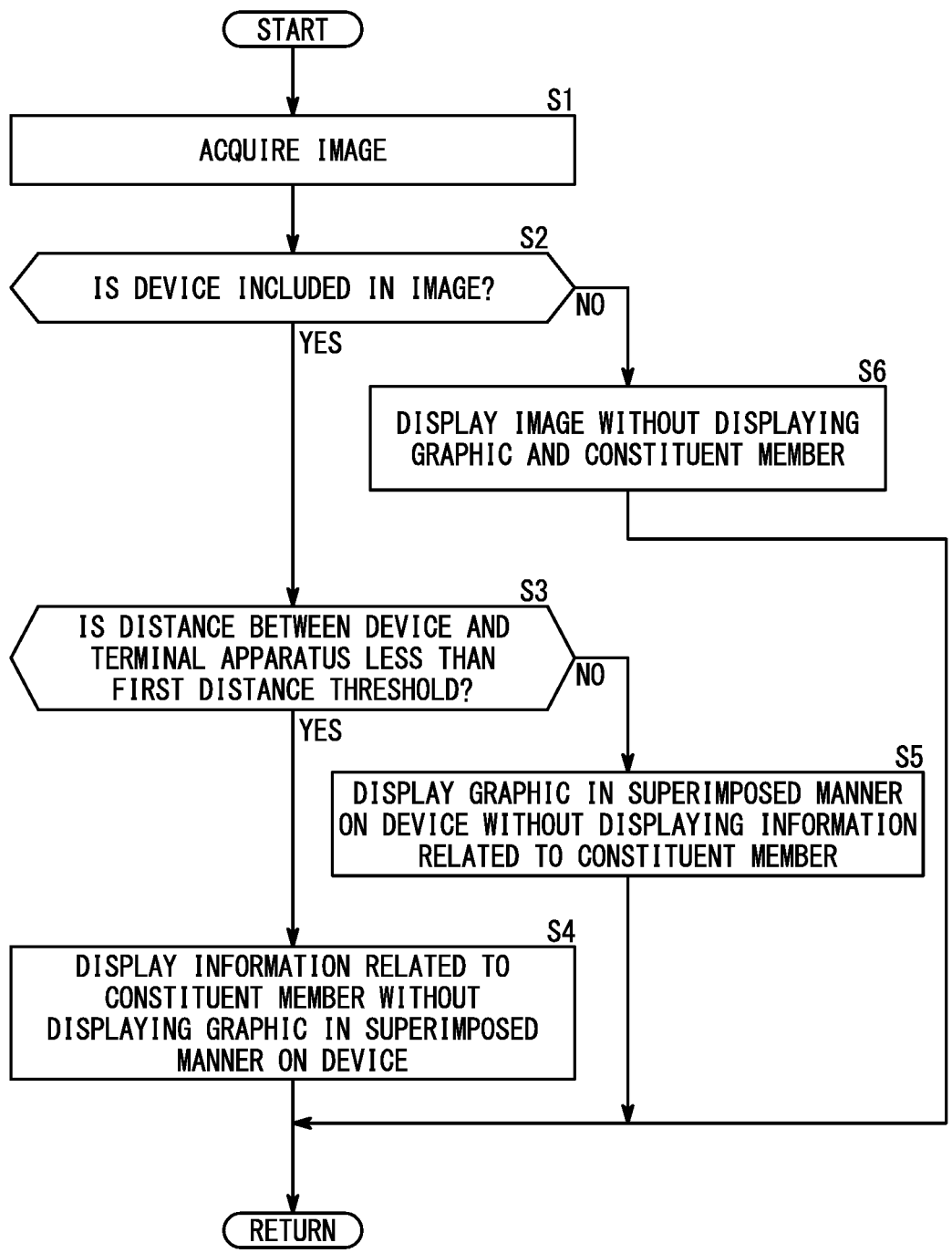
FIG. 5 is a flowchart illustrating an example of an information providing method according to an embodiment.

Next, an example of an information providing method according to the present embodiment will be described with reference to FIG. 5. FIG. 5 is a flowchart illustrating an example of the information providing method according to the present embodiment.

First, in step S1, the image acquisition unit 36 acquires an image obtained using the imaging unit 16. Thereafter, the process proceeds to step S2.

In step S2, the determination unit 42 determines whether or not at least one of the plurality of devices 102 installed in the vehicle interior 100 is included in the image acquired by the image acquisition unit 36. In a case where at least one of the plurality of devices 102 installed in the vehicle interior 100 is included in the image (YES in step S2), the process proceeds to step S3. More specifically, in a case where the device 102 that is the target of the augmented reality display is included in the image, the process proceeds to step S3. In a case where at least one of the plurality of devices 102 installed in the vehicle interior 100 is not included in the image (NO in step S2), the process proceeds to step S6.

In step S3, the control unit 34 determines whether or not the distance between the device 102 and the terminal apparatus 12 is less than the first distance threshold DTH1. In a case where the distance between the device 102 and the terminal apparatus 12 is less than the first distance threshold DTH1 (YES in step S3), the process proceeds to step S4. In a case where the distance between the device 102 and the terminal apparatus 12 is equal to or greater than the first distance threshold DTH1 (NO in step S3), the process proceeds to step S5.

In step S4, the display control unit 44 displays, for the constituent member 104, the information 64 related to the constituent member 104 constituting the device 102 without displaying the graphic 31 corresponding to the device 102 in a superimposed manner on the device 102. When step S4 is completed, the process shown in FIG. 5 is completed.

In step S5, the display control unit 44 displays the graphic 31 corresponding to the device 102 in a superimposed manner on the device 102 without displaying the information 64 related to the constituent member 104 constituting the device 102. When step S5 is completed, the process shown in FIG. 5 is completed.

In step S6, the display control unit 44 displays the image acquired by the image acquisition unit 36 on the display unit 28 without displaying the graphic 31 corresponding to the device 102 and the information 64 related to the constituent member 104 constituting the device 102 on the display unit 28. When step S6 is completed, the process shown in FIG. 5 is completed.

Figure 6:
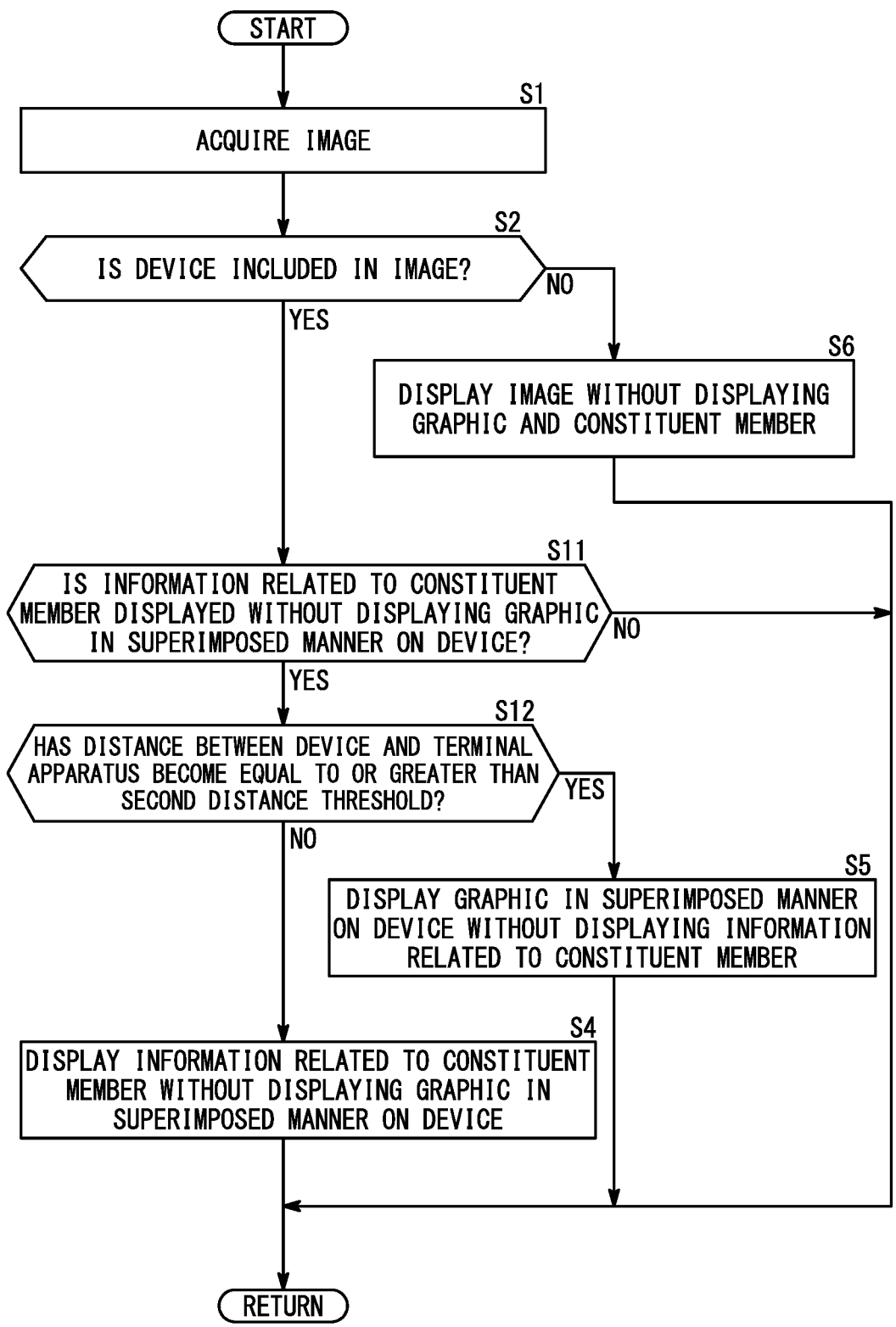
FIG. 6 is a flowchart illustrating an example of an information providing method according to the embodiment.

Next, an example of an information providing method according to the present embodiment will be described with reference to FIG. 6. FIG. 6 is a flowchart illustrating an example of the information providing method according to the present embodiment.

First, since steps S1 and S2 are the same as steps S1 and S2 described above, description thereof will be omitted. In a case where at least one of the plurality of devices 102 installed in the vehicle interior 100 is included in the image acquired by the image acquisition unit 36 (YES in step S2), the process proceeds to step S11. In a case where at least one of the plurality of devices 102 installed in the vehicle interior 100 is not included in the image (NO in step S2), the process proceeds to step S6.

In step S11, the display control unit 44 determines whether or not the information 64 related to the constituent member 104 constituting the device 102 is displayed for the constituent member 104 without displaying the graphic 31 corresponding to the device 102 in a superimposed manner on the device 102. In a case where the information 64 related to the constituent member 104 constituting the device 102 is displayed without displaying the graphic 31 corresponding to the device 102 in a superimposed manner on the device 102 (YES in step S11), the process proceeds to step S12. In a case where the graphic 31 corresponding to the device 102 is displayed in a superimposed manner on the device 102 without displaying the information 64 related to the constituent member 104 constituting the device 102 (NO in step S11), the process shown in FIG. 6 is completed.

In step S12, the control unit 34 determines whether or not the distance between the device 102 and the terminal apparatus 12 becomes equal to or greater than the second distance threshold DTH2. In a case where the distance between the device 102 and the terminal apparatus 12 is less than the second distance threshold DTH2 (NO in step S12), the process proceeds to step S4. In a case where the distance between the device 102 and the terminal apparatus 12 is equal to or greater than the second distance threshold DTH2 (YES in step S12), the process proceeds to step S5.

Since steps S4 to S6 are the same as steps S4 to S6 described above, description thereof will be omitted.

Thus, the process shown in FIG. 6 can be performed.

Figure 7:
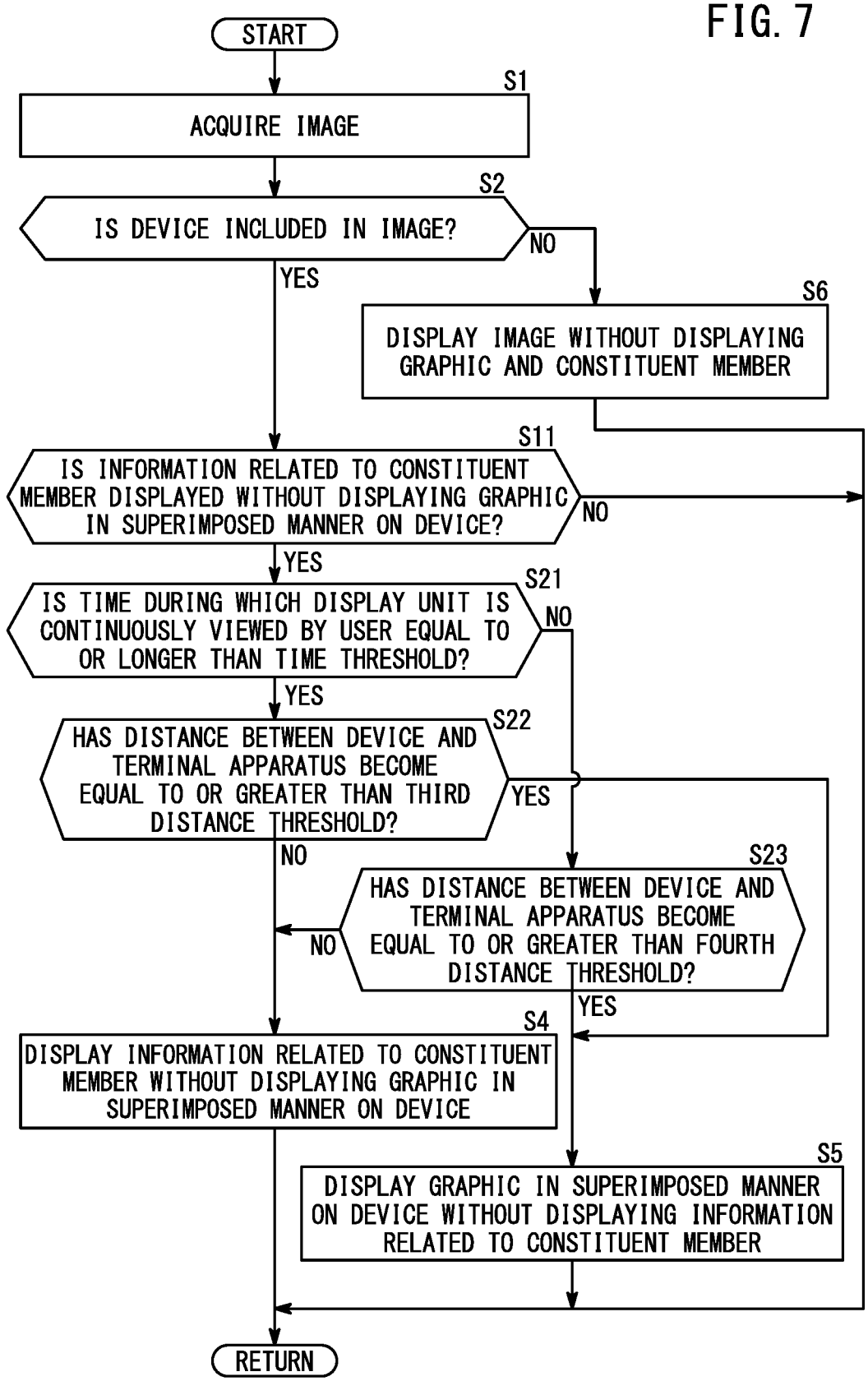
FIG. 7 is a flowchart illustrating an example of an information providing method according to the embodiment.

Next, an example of an information providing method according to the present embodiment will be described with reference to FIG. 7. FIG. 7 is a flowchart illustrating an example of the information providing method according to the present embodiment.

First, since steps S1, S2, and S11 are the same as steps S1, S2, and S11 described above, description thereof will be omitted. In a case where the information 64 related to the constituent member 104 constituting the device 102 is displayed without displaying the graphic 31 corresponding to the device 102 in a superimposed manner on the device 102 (YES in step S11), the process proceeds to step S21. In a case where the graphic 31 corresponding to the device 102 is displayed in a superimposed manner on the device 102 without displaying the information 64 related to the constituent member 104 constituting the device 102 (NO in step S11), the process shown in FIG. 7 is completed.

In step S21, the control unit 34 determines whether or not the time during which the display unit 28 displaying the information 64 related to the constituent member 104 constituting the device 102 is continuously viewed by the user is equal to or longer than the time threshold TTH. In a case where the time during which the display unit 28 displaying the information 64 related to the constituent member 104 is continuously viewed by the user is equal to or longer than the time threshold TTH (YES in step S21), the process proceeds to step S22. In a case where the time during which the display unit 28 displaying the information 64 related to the constituent member 104 is continuously viewed by the user is less than the time threshold TTH (NO in step S21), the process proceeds to step S23.

In step S22, the control unit 34 determines whether or not the distance between the device 102 and the terminal apparatus 12 becomes equal to or greater than the third distance threshold DTH3. In a case where the distance between the device 102 and the terminal apparatus 12 is equal to or greater than the third distance threshold DTH3 (YES in step S22), the process proceeds to step S5. In a case where the distance between the device 102 and the terminal apparatus 12 is less than the third distance threshold DTH3 (NO in step S22), the process proceeds to step S4.

In step S23, the control unit 34 determines whether or not the distance between the device 102 and the terminal apparatus 12 becomes equal to or greater than the fourth distance threshold DTH4. In a case where the distance between the device 102 and the terminal apparatus 12 is equal to or greater than the fourth distance threshold DTH4 (YES in step S23), the process proceeds to step S5. In a case where the distance between the device 102 and the terminal apparatus 12 is less than the fourth distance threshold DTH4 (NO in step S23), the process proceeds to step S4.

Since steps S4 to S6 are the same as steps S4 to S6 described above, description thereof will be omitted.

Thus, the process shown in FIG. 7 can be performed.

Figure 8:
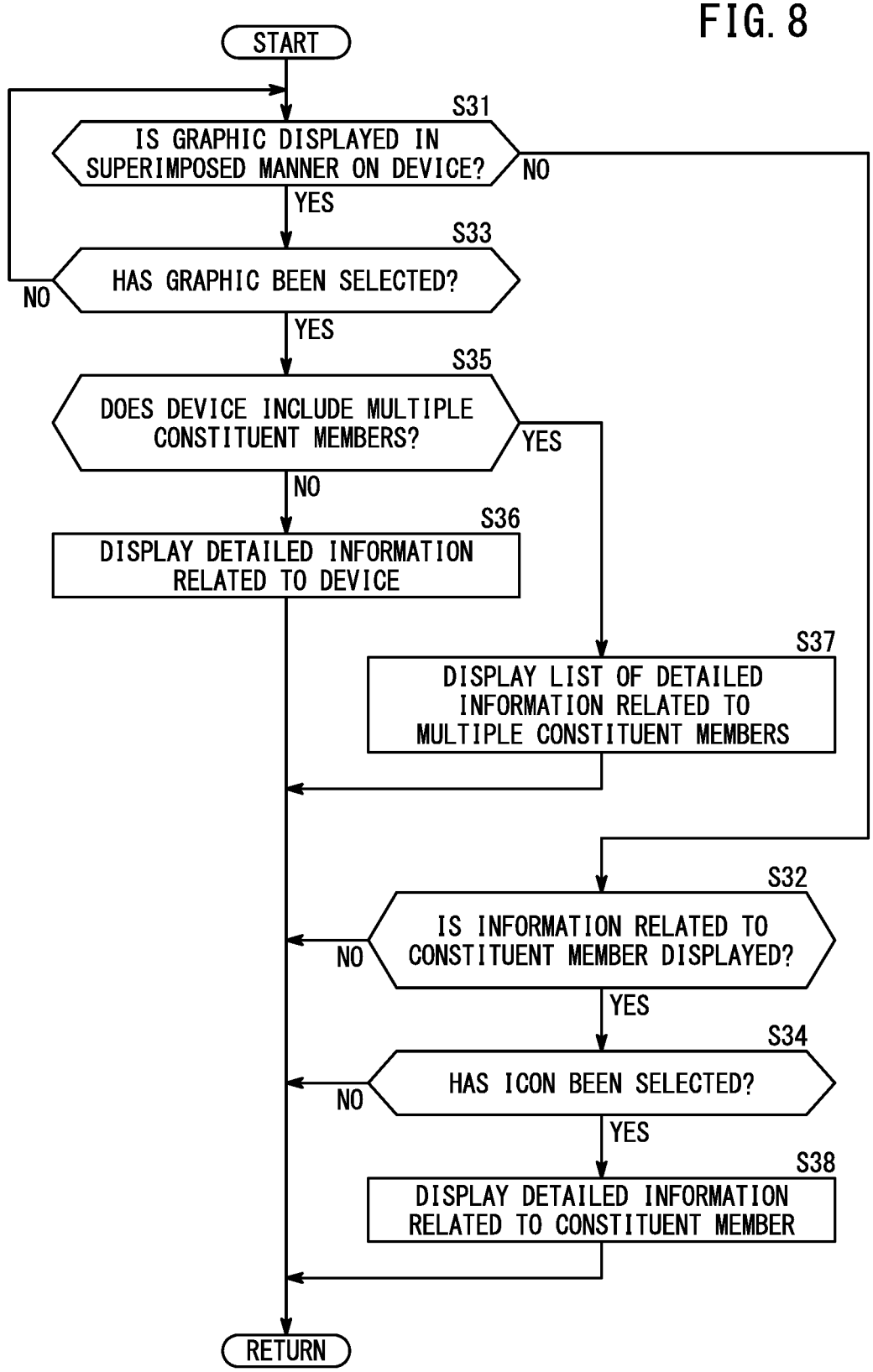
FIG. 8 is a flowchart illustrating an example of an information providing method according to the embodiment.

Next, an example of an information providing method according to the present embodiment will be described with reference to FIG. 8. FIG. 8 is a flowchart illustrating an example of the information providing method according to the present embodiment.

In step S31, the display control unit 44 determines whether or not the graphic 31 corresponding to the device 102 is displayed in a superimposed manner on the device 102. In a case where the graphic 31 corresponding to the device 102 is displayed in a superimposed manner on the device 102 (YES in step S31), the process proceeds to step S33. In a case where the graphic 31 corresponding to the device 102 is not displayed in a superimposed manner on the device 102 (NO in step S31), the process proceeds to step S32.

In step S32, the display control unit 44 determines whether or not the information 64 related to the constituent member 104 constituting the device 102 is displayed on the display unit 28. In a case where the information 64 related to the constituent member 104 constituting the device 102 is displayed on the display unit 28 (YES in step S32), the process proceeds to step S34. In a case where the information 64 related to the constituent member 104 constituting the device 102 is not displayed on the display unit 28 (NO in step S32), the process shown in FIG. 8 is completed.

In step S33, the display control unit 44 determines whether or not the graphic 31 corresponding to the device 102 has been selected by the user. In a case where the graphic 31 corresponding to the device 102 has been selected by the user (YES in step S33), the process proceeds to step S35. In a case where the graphic 31 corresponding to the device 102 has not been selected by the user (NO in step S33), the processes after step S31 are repeated.

In step S34, the display control unit 44 determines whether or not the icon 66 for instructing display of detailed information related to the constituent member 104 constituting the device 102 has been selected by the user. In a case where the icon 66 has been selected by the user (YES in step S34), the process proceeds to step S38. In a case where the icon 66 has not been selected by the user (NO in step S34), the process shown in FIG. 8 is completed.

In step S35, the display control unit 44 determines whether or not the device 102 includes a plurality of the constituent members 104 constituting the device 102. In a case where the device 102 includes the plurality of constituent members 104 (YES in step S35), the process proceeds to step S37. In a case where the number of the constituent members 104 provided in the device 102 is not plural (NO in step S35), the process proceeds to step S36.

In step S36, the display control unit 44 displays, on the display screen 28A of the display unit 28, the detailed information related to the device 102 on which the graphic 31 selected by the user has been displayed in a superimposed manner.

In step S37, the display control unit 44 displays, on the display screen 28A of the display unit 28, a list of pieces of detailed information related to the plurality of constituent members 104 constituting the device 102 on which the graphic 31 selected by the user has been displayed in a superimposed manner.

In step S38, the display control unit 44 displays, on the display screen 28A of the display unit 28, the detailed information related to the constituent member 104 constituting the device 102. That is, the display control unit 44 displays, on the display screen 28A of the display unit 28, the detailed information related to the constituent member 104 for which the icon 66 has been selected.

Thus, the process shown in FIG. 8 can be performed.

Next, an example of an information providing method according to the present embodiment will be described with reference to FIG. 9. FIG. 9 is a flowchart illustrating an example of the information providing method according to the present embodiment.

In step S41, the display control unit 44 determines whether or not the device 102 hidden by the device 102 appearing in the image exists. In a case where the device 102 hidden by the device 102 appearing in the image exists (YES in step S41), the process proceeds to step S42. In a case where the device 102 hidden by the device 102 appearing in the image does not exist (NO in step S41), the process shown in FIG. 9 is completed.

In step S42, the display control unit 44 displays the information 64 related to the hidden device 102 on the display screen 28A of the display unit 28 to be smaller than the information 64 related to the device 102 appearing in the image. Thereafter, the process proceeds to step S43.

In step S43, the display control unit 44 determines whether or not the user has selected the hide button 76 for hiding the information 64 related to the hidden device 102. In a case where the user has selected the hide button 76 for hiding the information 64 related to the hidden device 102 (YES in step S43), the process proceeds to step S46. In a case where the user has not selected the hide button 76 for hiding the information 64 related to the hidden device 102 (NO in step S43), the process proceeds to step S44.

In step S44, the display control unit 44 determines whether or not the user has performed a swipe operation on the box 62 in which the information 64 related to the hidden device 102 is displayed. In a case where the user has performed the swipe operation on the box 62 (YES in step S44), the process proceeds to step S46. In a case where the user has not performed the swipe operation on the box 62 (NO in step S44), the process proceeds to step S45.

In step S45, the display control unit 44 determines whether or not the user has selected the collective hide button (not shown) for collectively hiding pieces of the information 64 respectively related to the plurality of hidden devices 102. In a case where the user has selected the collective hide button (YES in step S45), the process proceeds to step S46. In a case where the user has not selected the collective hide button (NO in step S45), the process shown in FIG. 9 is completed.

In step S46, the display control unit 44 hides the information 64 related to the hidden device 102. In a case where the user has selected the hide button 76 or performed the swipe operation on the box 62, the display control unit 44 hides the information 64 related to the hidden device 102. In a case where the user has selected the collective hide button, the display control unit 44 collectively hides the pieces of information 64 respectively related to the plurality of hidden devices 102.

Thus, the process shown in FIG. 9 is completed.

As described above, according to the present embodiment, in a case where at least one of the plurality of devices 102 installed in the vehicle interior 100 is included in the image, the graphic 31 corresponding to the device 102 is displayed in a superimposed manner on the device 102, and the information indicating the type to which the device 102 belongs is also displayed. Therefore, according to the present embodiment, it is possible to more satisfactorily provide information related to the device 102 in the vehicle interior 100.

It should be noted that the present invention is not limited to the above-described embodiments, and various configurations can be adopted without departing from the gist of the present invention.

The above embodiments are summarized as follows.

Then information providing method according to the present invention is an information providing method in which a terminal apparatus (12) including an imaging unit (16) and a display unit (28) displays, on the display unit, an image of a vehicle interior (100) captured by the imaging unit, wherein a plurality of devices (102A to 102O) are installed in the vehicle interior, the plurality of devices being classified into a plurality of types, the information providing method comprising: an image acquisition step (S1) of acquiring the image of the vehicle interior captured by the imaging unit; and a display step (S5) of displaying the image on the display unit, and in a case where at least one of the plurality of devices is included in the image, displaying a graphic (31A to 31O) corresponding to the device in a superimposed manner on the device and also displaying information indicating a type to which the device belongs. According to such a configuration, in a case where at least one of the plurality of devices installed in the vehicle interior is included in the image, the graphic corresponding to the device is displayed in a superimposed manner on the device, and the information indicating the type to which the device belongs is also displayed. For this reason, according to such a configuration, it is possible to more satisfactorily provide information related to the device in the vehicle interior.

The graphic may be a translucent graphic.

The information indicating the type to which the device belongs may be a color corresponding to the type. Since the graphic in the color corresponding to the type is displayed in a superimposed manner on the device, the user can satisfactorily grasp the function or the like of the device based on the color.

The graphic may be a three dimensional graphic. Displaying a three dimensional graphic contributes to smooth recognition of the user.

The graphic may have a size corresponding to a size of the device. Displaying a graphic having a size corresponding to the size of the device contributes to smooth recognition of the user.

The graphic may have a shape corresponding to a shape of the device. Displaying a graphic having a shape corresponding to the shape of the device contributes to smooth recognition of the user.

The device may include a constituent member (104FA to 104FC) constituting a part of the device, and in the display step (S4, S5), in a case where a distance between the device and the terminal apparatus is equal to or greater than a first distance threshold (DTH1), the graphic may be displayed in the superimposed manner on the device without displaying, for the constituent member, information related to the constituent member, and in a case where the distance between the device and the terminal apparatus is less than the first distance threshold, the information related to the constituent member may be displayed for the constituent member without displaying the graphic. According to such a configuration, in a case where the distance between the device and the terminal apparatus is equal to or greater than the first distance threshold, the graphic is displayed in a superimposed manner on the device without displaying, for the constituent member, the information related to the constituent member. According to such a configuration, it is possible to prevent pieces of information related to a plurality of constituent members from being displayed close to each other. Further, according to such a configuration, in a case where the distance between the device and the terminal apparatus is less than the first distance threshold, the information related to the constituent member is displayed for the constituent member without displaying the graphic in a superimposed manner. In a case where the distance between the device and the terminal apparatus is less than the first distance threshold, the constituent members adjacent to each other appear in the image in a state of being sufficiently separated from each other. Therefore, even when pieces of information related to the plurality of constituent members are displayed, the user can satisfactorily grasp these pieces of information.

The device may include a constituent member constituting a part of the device, and in the display step, in a case where a distance between the device and the terminal apparatus becomes less than a first distance threshold in a state where the graphic is displayed in the superimposed manner on the device, the graphic may be hidden and information related to the constituent member may be displayed for the constituent member, and in a case where the distance between the device and the terminal apparatus becomes equal to or greater than a second distance threshold (DTH2), which is greater than the first distance threshold, in a state where the information related to the constituent member is displayed for the constituent member, the information related to the constituent member may be hidden and the graphic may be displayed in the superimposed manner on the device. According to such a configuration, even if the terminal apparatus moves away from the device to some extent, the information related to the constituent member constituting the device continues to be displayed on the display screen of the display unit, which contributes to improvement in convenience.

The device may include a constituent member constituting a part of the device, and in the display step, in a case where a time during which the display unit displaying information related to the constituent member is continuously viewed by a user is equal to or longer than a time threshold (TTH), the information related to the constituent member may be hidden and the graphic may be displayed in the superimposed manner on the device when a distance between the device and the terminal apparatus becomes equal to or greater than a third distance threshold (DTH3), and in a case where the time during which the display unit displaying the information related to the constituent member is continuously viewed by the user is less than the time threshold, the information related to the constituent member may be hidden and the graphic may be displayed in the superimposed manner on the device when the distance between the device and the terminal apparatus becomes equal to or greater than a fourth distance threshold (DTH4), which is smaller than the third distance threshold. According to such a configuration, in a case where the information related to the constituent member is viewed by the user for a relatively long time, even if the terminal apparatus moves away from the device to some extent, the information related to the constituent member continues to be displayed on the display screen of the display unit. This contributes to improvement in convenience.

In the display step, in a case where the graphic has been selected by a user in a state where the graphic is displayed in the superimposed manner on the device, detailed information related to the device on which the selected graphic has been displayed in the superimposed manner may be displayed on the display unit.

In the display step, in a case where the device includes a plurality of the constituent members and the graphic has been selected by the user in the state where the graphic is displayed in the superimposed manner on the device, a list of pieces of detailed information related to the plurality of constituent members provided in the device on which the selected graphic has been displayed in the superimposed manner may be displayed on the display unit.

In the display step, in a case where an icon (66) configured to instruct display of detailed information related to the constituent member provided in the device has been selected by a user in a state where the information related to the constituent member is displayed, the detailed information related to the constituent member may be displayed on the display unit.

In the display step, information (64M) related to a device (102M) hidden by the device (102) appearing in the image may be displayed on the display unit to be smaller than information (64FA to 64FC) related to the device appearing in the image. According to such a configuration, the user can satisfactorily grasp whether the information is related to the device appearing in the image or related to the hidden device.

In the display step, in a case where an operation for hiding the information related to the hidden device has been performed by a user, the information related to the hidden device may be hidden. According to such a configuration, the user can appropriately hide information that does not need to be displayed.

The operation for hiding the information related to the hidden device may be selection of a hide button (76) configured to allow the information related to the hidden device to be hidden.

The operation for hiding the information related to the hidden device may be a swipe operation on a box (62M) in which the information related to the hidden device is displayed.

In the display step, a collective hide button may be displayed, the collective hide button being configured to allow pieces of information respectively related to a plurality of the devices hidden by the device appearing in the image to be collectively hidden, and in a case where the collective hide button has been selected by a user, the pieces of information respectively related to the plurality of hidden devices may be collectively hidden.

A non-transitory computer-readable storage medium stores a program for causing a computer to execute the information providing method described above.

An information providing apparatus (12) includes an imaging unit and a display unit, and displays, on the display unit, an image of a vehicle interior captured by the imaging unit, wherein a plurality of devices are installed in the vehicle interior, the plurality of devices being classified into a plurality of types, and the information providing apparatus comprises: an image acquisition unit (36) configured to acquire the image of the vehicle interior captured by the imaging unit; and a display control unit (44) configured to display the image on the display unit, and in a case where at least one of the plurality of devices is included in the image, display a graphic corresponding to the device in a superimposed manner on the device and also display information indicating a type to which the device belongs.

What is claimed is:

1. An information providing method in which a terminal apparatus including an imaging unit and a display unit displays, on the display unit, an image of a vehicle interior captured by the imaging unit, wherein
a plurality of devices are installed in the vehicle interior, the plurality of devices being classified into a plurality of types,
the information providing method comprising:
acquiring the image of the vehicle interior captured by the imaging unit; and
displaying the image on the display unit, and in a case where at least one of the plurality of devices is included in the image, displaying a graphic corresponding to the device in a superimposed manner on the device and also displaying information indicating a type to which the device belongs,
wherein the graphic has a shape corresponding to a shape of the device.

2. The information providing method according to claim 1, wherein
the graphic is a translucent graphic.

3. The information providing method according to claim 1, wherein
the information indicating the type to which the device belongs is a color corresponding to the type.

4. The information providing method according to claim 1, wherein
the graphic is a three dimensional graphic.

5. The information providing method according to claim 1, wherein
the graphic has a size corresponding to a size of the device.

6. The information providing method according to claim 1, wherein
the device includes a constituent member constituting a part of the device, and
in the displaying, in a case where a distance between the device and the terminal apparatus is equal to or greater than a first distance threshold, the graphic is displayed in the superimposed manner on the device without displaying, for the constituent member, information related to the constituent member, and in a case where the distance between the device and the terminal apparatus is less than the first distance threshold, the information related to the constituent member is displayed for the constituent member without displaying the graphic.

7. The information providing method according to claim 6, wherein
in the displaying, in a case where the graphic has been selected by a user in a state where the graphic is displayed in the superimposed manner on the device, detailed information related to the device on which the selected graphic has been displayed in the superimposed manner is displayed on the display unit.

8. The information providing method according to claim 7, wherein
in the displaying, in a case where the device includes a plurality of the constituent members and the graphic has been selected by the user in the state where the graphic is displayed in the superimposed manner on the device, a list of pieces of detailed information related to the plurality of constituent members provided in the device on which the selected graphic has been displayed in the superimposed manner is displayed on the display unit.

9. The information providing method according to claim 6, wherein
in the displaying, in a case where an icon configured to instruct display of detailed information related to the constituent member provided in the device has been selected by a user in a state where the information related to the constituent member is displayed, the detailed information related to the constituent member is displayed on the display unit.

10. The information providing method according to claim 1, wherein
the device includes a constituent member constituting a part of the device, and
in the displaying, in a case where a distance between the device and the terminal apparatus becomes less than a first distance threshold in a state where the graphic is displayed in the superimposed manner on the device, the graphic is hidden and information related to the constituent member is displayed for the constituent member, and in a case where the distance between the device and the terminal apparatus becomes equal to or greater than a second distance threshold, which is greater than the first distance threshold, in a state where the information related to the constituent member is displayed for the constituent member, the information related to the constituent member is hidden and the graphic is displayed in the superimposed manner on the device.

11. The information providing method according to claim 1, wherein
the device includes a constituent member constituting a part of the device, and
in the displaying, in a case where a time during which the display unit displaying information related to the constituent member is continuously viewed by a user is equal to or longer than a time threshold, the information related to the constituent member is hidden and the graphic is displayed in the superimposed manner on the device when a distance between the device and the terminal apparatus becomes equal to or greater than a third distance threshold, and in a case where the time during which the display unit displaying the information related to the constituent member is continuously viewed by the user is less than the time threshold, the information related to the constituent member is hidden and the graphic is displayed in the superimposed manner on the device when the distance between the device and the terminal apparatus becomes equal to or greater than a fourth distance threshold, which is smaller than the third distance threshold.

12. The information providing method according to claim 1, wherein
in the displaying, information related to a device hidden by the device appearing in the image is displayed on the display unit to be smaller than information related to the device appearing in the image.

13. The information providing method according to claim 12, wherein
in the displaying, in a case where an operation for hiding the information related to the hidden device has been performed by a user, the information related to the hidden device is hidden.

14. The information providing method according to claim 13, wherein
the operation for hiding the information related to the hidden device is selection of a hide button configured to allow the information related to the hidden device to be hidden.

15. The information providing method according to claim 13, wherein
the operation for hiding the information related to the hidden device is a swipe operation on a box in which the information related to the hidden device is displayed.

16. The information providing method according to claim 12, wherein
in the displaying, a collective hide button is displayed, the collective hide button being configured to allow pieces of information respectively related to a plurality of the devices hidden by the device appearing in the image to be collectively hidden, and in a case where the collective hide button has been selected by a user, the pieces of information respectively related to the plurality of hidden devices are collectively hidden.

17. A non-transitory computer-readable storage medium storing a program, the program causing a computer to execute an information providing method in which a terminal apparatus including an imaging unit and a display unit displays, on the display unit, an image of a vehicle interior captured by the imaging unit, wherein a plurality of devices are installed in the vehicle interior, the plurality of devices being classified into a plurality of types,
the information providing method comprising:
acquiring the image of the vehicle interior captured by the imaging unit; and
displaying the image on the display unit, and in a case where at least one of the plurality of devices is included in the image, displaying a graphic corresponding to the device in a superimposed manner on the device and also displaying information indicating a type to which the device belongs,
wherein the graphic has a shape corresponding to a shape of the device.

18. An information providing apparatus including an imaging unit and a display unit, the information providing apparatus displaying, on the display unit, an image of a vehicle interior captured by the imaging unit, wherein
a plurality of devices are installed in the vehicle interior, the plurality of devices being classified into a plurality of types, and
the information providing apparatus comprises one or more processors that execute computer-executable instructions stored in a memory,
the one or more processors executing the computer-executable instructions to cause the information providing apparatus to:
acquire the image of the vehicle interior captured by the imaging unit; and
display the image on the display unit, and in a case where at least one of the plurality of devices is included in the image, display a graphic corresponding to the device in a superimposed manner on the device and also display information indicating a type to which the device belongs,
wherein the graphic has a shape corresponding to a shape of the device.

* * * * *